United States Patent
Kanno et al.

(10) Patent No.: US 12,374,716 B2
(45) Date of Patent: *Jul. 29, 2025

(54) SULFIDE SOLID ELECTROLYTE AND ALL SOLID STATE BATTERY

(71) Applicants: TOKYO INSTITUTE OF TECHNOLOGY, Tokyo-to (JP); TOYOTA JIDOSHA KABUSHIKI KAISHA, Toyota (JP)

(72) Inventors: Ryoji Kanno, Tokyo-to (JP); Satoshi Hori, Tokyo-to (JP); Shinya Shiotani, Nagoya (JP)

(73) Assignees: TOKYO INSTITUTE OF TECHNOLOGY, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/619,886

(22) Filed: Mar. 28, 2024

(65) Prior Publication Data

US 2024/0243351 A1    Jul. 18, 2024

Related U.S. Application Data

(63) Continuation of application No. 17/049,136, filed as application No. PCT/JP2019/008110 on Mar. 1, 2019, now Pat. No. 11,973,183.

(30) Foreign Application Priority Data

Apr. 25, 2018 (JP) ................. 2018-084195

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0068* (2013.01)

(58) Field of Classification Search
CPC .......... H01M 10/052; H01M 10/0525; H01M 10/0562; H01M 10/0585; H01M 2300/0068; C01B 17/22; C01D 15/00; C01P 2002/86; C01P 2004/04; H01B 1/10; Y02E 60/10
See application file for complete search history.

(56) References Cited

U.S. PATENT DOCUMENTS

2017/0040636 A1    2/2017 Oki et al.

FOREIGN PATENT DOCUMENTS

| JP | 2010-218827 A | 9/2010 |
| JP | 2013-030440 A | 2/2013 |
| JP | 5787291 B2 | 9/2015 |

OTHER PUBLICATIONS

Machine translation JP2013030440 (Year: 2013).

(Continued)

*Primary Examiner* — Miriam Stagg
*Assistant Examiner* — Lilia Nedialkova
(74) *Attorney, Agent, or Firm* — Oliff PLC

(57) ABSTRACT

A main object of the present disclosure is to provide a sulfide solid electrolyte capable of suppressing a decrease in Li ion conductivity due to moisture. The present disclosure achieves the object by providing a sulfide solid electrolyte comprising a Li element, a P element, a S element and an O element, and having a granular shape, and including a crystal portion oriented along the granular shape, on an inner surface of the sulfide solid electrolyte.

6 Claims, 3 Drawing Sheets

(56) References Cited

OTHER PUBLICATIONS

Dec. 27, 2022 Office Action Issued in U.S. Appl. No. 17/049,136.
Minami, K. et al. Electrical and electrochemical properties of the 70 LI2S (30-x)P2S5 xP2O5 glass-ceramic electrolytes, Solid state Ionics, vol. 179. pp 1282-1285, published 2008. (Year: 2008).
Hayshi, A. et al. "Improved chemical stability and cyclability in Li2S-P2S5-P2O5-ZnO composite electrolytes for all-solid state rechargeable lithium batteries", Journal of Alloys and Compounds, vol. 591. pp 247-250, published Jan. 2014. (Year: 2014).
Takada, K. et al. "Lithium ion conductive oxysulfide, Li3PO4-Li3PS4", Solid State Ionics, vol. 176, 2355-2359, published 2005. (Year: 2005).
Aug. 11, 2023 Office Action Issued In U.S. Appl. No. 17/049,136.
Jan. 8, 2024 Notice of Allowance Issued In U.S. Appl. No. 17/049,136.

SULFIDE SOLID ELECTROLYTE AND ALL SOLID STATE BATTERY

CROSS REFERENCE TO RELATED APPLICATION

This application is a continuation of U.S. application Ser. No. 17/049,136, filed Oct. 20, 2020, the contents of which are incorporated herein by reference.

TECHNICAL FIELD

The present disclosure relates to a sulfide solid electrolyte capable of suppressing a decrease in Li ion conductivity due to moisture.

BACKGROUND ART

An all solid state battery is a battery including a solid electrolyte layer between a cathode active material layer and an anode active material layer, and having an advantage that, compared to a liquid battery including a liquid electrolyte containing a flammable organic solvent, it is easier to simplify the safeguard thereof.

As a solid electrolyte used for the all solid state battery, a sulfide solid electrolyte has been known. Patent Literature 1 discloses, for example, a method for producing a crystallized sulfide solid electrolyte material comprising: a step of amorphizing a raw material composition including $Li_2S$ and $P_2S_5$ in a predetermined proportion, and then, a step of heat treating under specific conditions. The challenge of this technique is to reduce the generating amount of hydrogen sulfide.

CITATION LIST

Patent Literature

Patent Literature 1: Japanese Patent Application Laid-Open (JP-A) No. 2010-218827

SUMMARY OF INVENTION

Technical Problem

The Li ion conductivity of the sulfide solid electrolyte tends to be decreased due to moisture (such as moisture in an atmosphere). The present disclosure has been made in view of the above circumstances, and a main object thereof is to provide a sulfide solid electrolyte capable of suppressing a decrease in Li ion conductivity due to moisture.

Solution to Problem

The present disclosure provides a sulfide solid electrolyte comprising a Li element, a P element, a S element and an O element, and having a granular shape, and including a crystal portion oriented along the granular shape, on an inner surface of the sulfide solid electrolyte.

According to the present disclosure, by including a crystal portion on an inner surface of the sulfide solid electrolyte, a sulfide solid electrolyte capable of suppressing a decrease in Li ion conductivity due to moisture may be obtained.

In the disclosure, the sulfide solid electrolyte may have a composition represented by $Li_{3+x}PS_{4-y}O_y$, wherein x satisfies $0 \leq x \leq 1$, and y satisfies $0 < y < 4$.

In the disclosure, the x may satisfy $0 \leq x \leq 0.2$, and the y may satisfy $0.8 \leq y \leq 1.2$.

In the disclosure, a thickness of the crystal portion may be 1.7 nm or more.

The present disclosure also provides an all solid state battery comprising a cathode active material layer including a cathode active material, an anode active material layer including an anode active material, and a solid electrolyte layer formed between the cathode active material layer and the anode active material layer, and at least one of the cathode active material layer, the anode active material layer, and the solid electrolyte layer includes the above described sulfide solid electrolyte.

According to the present disclosure, by using the above described sulfide solid electrolyte, the output property of an all solid state battery may be maintained even, for example, under a high humidity environment.

Advantageous Effects of Invention

The sulfide solid electrolyte in the present disclosure exhibits an effect that a decrease in Li ion conductivity due to moisture may be suppressed.

DESCRIPTION OF EMBODIMENTS

A sulfide solid electrolyte and an all solid state battery in the present disclosure are hereinafter described in detail.

A. Sulfide Solid Electrolyte

Figure 1A:
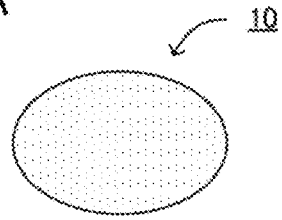
FIGS. 1A to 1C are schematic diagrams explaining the sulfide solid electrolyte in the present disclosure.
Figure 1B:
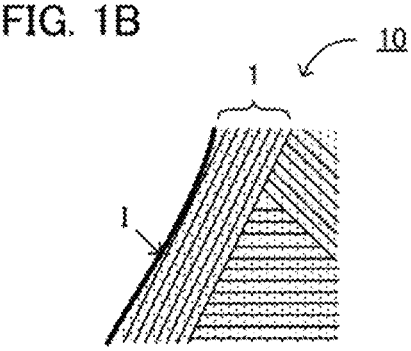
Figure 1C:
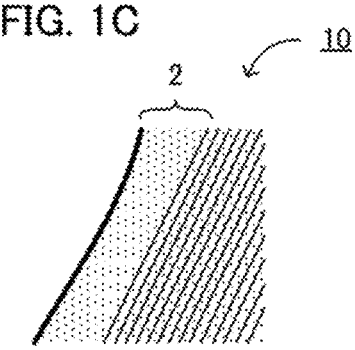

FIGS. 1A to 1C are schematic diagrams explaining the sulfide solid electrolyte in the present disclosure. FIG. 1A is a schematic cross-sectional view showing an example of the sulfide solid electrolyte. Sulfide solid electrolyte 10 shown in FIG. 1A comprises a Li element, a P element, a S element and an O element, and has a granular shape. Also, FIG. 1B is an enlarged view wherein the vicinity of the surface of the sulfide solid electrolyte in FIG. 1A is enlarged. In the present disclosure, as shown in FIG. 1B, sulfide solid electrolyte 10 includes crystal portion 1 oriented along the granular shape, on an inner surface. As shown in FIG. 1B, "inner surface" refers to the surface on sulfide solid electrolyte 10 side, with respect to interface I of the particle. Incidentally, as described in the later described Comparative Examples, when an amorphizing treatment and a heat treatment are carried out, amorphous portion 2 tends to be formed on the inner surface of sulfide solid electrolyte 10 as shown in FIG. 1C.

According to the present disclosure, by including a crystal portion on an inner surface of the sulfide solid electrolyte, a sulfide solid electrolyte capable of suppressing a decrease in Li ion conductivity due to moisture may be obtained. Here, Patent Literature 1 discloses, a method for producing a crystallized sulfide solid electrolyte material comprising: a step of amorphizing a raw material composition including $Li_2S$ and $P_2S_5$ in a predetermined proportion, and then, a step of heat treating under specific conditions. In Patent Literature 1, the generation of the hydrogen sulfide due to moisture is suppressed by adjusting the proportion of $Li_2S$ and $P_2S_5$ to include more $PS_4^{3-}$ structure with good water resistance.

Meanwhile, in Patent Literature 1, although the generation of the hydrogen sulfide due to moisture may be suppressed, there is a new problem that Li ion conductivity is remarkably decreased when the sulfide solid electrolyte becomes into contact with moisture. The accumulation of utmost research in view of the above circumstances have led the present inventors to find out that the remarkable decrease of Li ion conductivity is likely to be caused by the nanometer order sized amorphous portion existing on the inner surface of the sulfide solid electrolyte. Therefore, the present inventors formed a crystal portion, not the amorphous portion, on the inner surface of the sulfide solid electrolyte, and it was confirmed that a decrease in Li ion conductivity due to moisture may be suppressed. Incidentally, since measuring methods to investigate the condition of the nanometer order sized region, are extremely limited, it is difficult to predict the phenomenon that occurs in the nanometer order sized region. However, the present inventors have studied the phenomenon carefully, and have solved the new problem that Li ion conductivity is remarkably decreased.

The sulfide solid electrolyte in the present disclosure comprises a Li element, a P element, an S element and an O element. The proportion of the Li element, the P element, the S element and the O element to all elements contained in the sulfide solid electrolyte is, for example, 70 mol % or more, may be 80 mol % or more, and may be 90 mol % or more. Further, the proportion of the O element to the sum of the S element and the O element is, for example, 5 mol % or more, may be 10 mol % or more, and may be 20 mol % or more. On the other hand, the above described proportion of the O element is, for example, 70 mol % or less, may be 60 mol % or less, and may be 50 mol % or less.

The sulfide solid electrolyte has a granular shape. The average particle size ($D_{50}$) of the sulfide solid electrolyte is, for example, 0.1 μm or more, may be 0.5 μm or more, and may be 1 μm or more. Meanwhile, the average particle size ($D_{50}$) of the sulfide solid electrolyte is, for example, 50 μm or less, and may be 30 μm or less. The average particle size ($D_{50}$) may be determined from, for example, the results of particle size distribution measured by a laser diffraction scattering method.

The sulfide solid electrolyte includes a crystal portion oriented along the granular shape on an inner surface. By providing the crystal portion, a decrease in Li ion conductivity due to moisture may be suppressed. Also, the crystal portion is oriented along the granular shape. In other words, the orientation of the crystal plane in the crystal portion is along the granular shape (strictly, the outer peripheral shape of the particle). Such orientation occurs, for example, when a melt quenching method is used. That is, such orientation occurs in the process of decreasing the temperature from the outside toward the inside during quenching.

Among the all surface regions of the sulfide solid electrolyte, the proportion of the region where the crystal portion is formed is, for example, 90% or more, may be 95% or more, and may be 99% or more. This proportion may be determined, for example, by observation with an electron microscope. Further, the thickness of the crystal portion is, for example, 1.7 nm or more, may be 5 nm or more, and may be 10 nm or more. Meanwhile, the thickness of the crystal portion is, for example, 200 nm or less, and may be 100 nm or less. Also, as described in the later described Examples, the thickness of the crystal portion may not be even in some cases. In view of this point, the proportion of the region wherein the crystal portion with thickness of 1.7 nm or more is formed, among the all surface regions of the sulfide solid electrolyte is, for example, 90% or more, may be 95% or more, and may be 99% or more. In this case, the preferable thickness of the crystal portion is the same as that described above.

The sulfide solid electrolyte usually includes the crystal portion and a midportion located at inner side than the crystal portion. The crystal portion and the midportion have continuity as a material. In other words, there is no distinct interface between the crystal portion and the midportion, and the both are elements of a single material. The crystal portion contains a Li element, a P element, an S element and an O element. Further, the crystal portion has crystallinity. In particular, it is preferable that the crystal portion has the later described crystal phase. On the other hand, the midportion also contains a Li element, a P element, an S element and an O element. Further, it is preferable that the midportion also has crystallinity. In particular, the midportion preferably has the same crystal phase as the crystal portion. Also, the crystal portion and the midportion may have the same composition and may have different compositions. Specific examples of the latter may include a case where the crystal portion is segregated.

The sulfide solid electrolyte preferably includes an anion structure represented by $PS_{4-\alpha}O_\alpha^{3-}$ (cx is an integer of 0 or more and 4 or less) as a main component of the anion structure. The anion structure represented by a $PS_{4-\alpha}O_\alpha^{3-}$ includes a $PS_4^{3-}$, $PS_3O^{3-}$, $PS_2O_2^{3-}$, $PSO_3^{3-}$, and $PO_4^{3-}$. Among them, it is preferable that the sulfide solid electrolyte in the present disclosure includes $PS_4^{3-}$ as a main component of the anion structure. The reason therefore is to obtain high Li ion conductivity. The proportion of $PS_4^{3-}$ to all the anion structures in the sulfide solid electrolyte is preferably, for example, 50 mol % or more.

The sulfide solid electrolyte preferably includes no $Li_2S$. The reason therefore is to suppress the generation of hydrogen sulfide. When $Li_2S$ is used as the starting material, for example, it is preferable that the $Li_2S$ is not remained. "Including no $Li_2S$" may be confirmed by X-ray diffraction (XRD). Specifically, it is preferable that no $Li_2S$ peaks ($2\theta = 27.0°$, $31.2°$, $44.8°$, and $53.1°$) are observed in the XRD-measurement using CuKα ray.

It is preferable that the sulfide solid electrolyte includes no crosslinked sulfur. The reason therefore is to suppress the generation of hydrogen sulfide. Specifically, the crosslinked sulfur is an anion structure represented by $P_2S_7^{4-}$. "Including no crosslinked sulfur" may be confirmed by Raman spectroscopy. Specifically, the peak of $P_2S_7^{4-}$ appears in the vicinity of 402 $cm^{-1}$, and the peak of $PS_4^{3-}$ appears in the vicinity 417 $cm^{-1}$. In the present disclosure, it is preferable that intensity $I_{402}$ of the 402 $cm^{-1}$ is lower than intensity $I_{417}$ of the 417 $cm^{-1}$. With respect to the intensity $I_{417}$, the intensity $I_{402}$ is, for example, 70% or less, may be 50% or less, and may be 35% or less. In particular, it is preferable that the peak of $P_2S_7^{4-}$ is not observed.

The composition of the sulfide solid electrolyte is not particularly limited. The sulfide solid electrolyte preferably has a composition represented by, for example, $Li_{3+x}$ $PS_{4-y}O_y$ (x satisfies 0≤x≤1, y satisfies 0<y<4). In the above composition, x may be 0, and may be greater than 0. On the other hand, x is usually 1 or less, may be 0.5 or less, and may be 0.2 or less. Also, in the above composition, y may be 0.5 or more, and may be 0.8 or more. On the other hand, y may be 2 or less, may be 1.5 or less, and may be 1.2 or less.

It is preferable that the sulfide solid electrolyte includes a crystal phase of a LGPS type. The reason therefore is to improve the Li ion conductivity. This crystal phase is regarded as crystal phase A. The crystal phase A has a peak at positions of 2θ=13.0°±0.5°, 15.4°±0.5°, 18.0°±0.50, 21.1°±0.5°, 21.8°±0.5°, 24.3°±0.5°, 25.5°±0.5°, 28.4°±0.5°, 30.9° 0.5°, and 33.9°±0.5° in X-ray diffraction measurement using CuKα ray. Incidentally, these peak positions are defined in a range of ±0.5° because they may be varied according to, for example, the composition of the sulfide solid electrolyte. Incidentally the position of each peak may be in a range of ±0.3°, and may be in a range of ±0.1°. Also, it is preferable that the sulfide solid electrolyte in the present disclosure includes crystal phase A as a main phase. "Including as a main phase" means that the proportion of the crystal phase is the highest among all the crystal phases included in the sulfide solid electrolyte. The proportion of the crystal phase is, for example, 50 weight % or more, may be 70 weight % or more, and may be 90 weight % or more. Incidentally the proportion of the crystal phase may be measured by, for example, radiation XRD.

It is preferable that the sulfide solid electrolyte has high Li ion conductivity. The Li ion conductivity of the sulfide solid electrolyte at 25° C. is, for example, $1 \times 10^{-5}$ S/cm or more, and preferably $1 \times 10^{-4}$ S/cm or more.

Since the sulfide solid electrolyte in the present disclosure has good Li ion conductivity, it may be used in any application requiring Li ion conductivity. Among them, the sulfide solid electrolyte in the present disclosure is preferably used for an all solid state battery. For example, even in a high humidity environment, an all solid state battery with good output property may be obtained.

The method for producing the sulfide solid electrolyte in the present disclosure is not particularly limited. Examples of the method for producing a sulfide solid electrolyte may include a method including a preparation step of preparing a raw material composition containing a constituent component of the sulfide solid electrolyte, and a melt quenching step of heating, melting, and quenching the raw material composition. Incidentally, in the present disclosure, by appropriately adjusting the conditions of melt quenching, a sulfide solid electrolyte including a desired crystal portion may obtained.

The raw material composition contains a Li element, a P element, an S element and an O element. Examples of the raw material containing Li element may include a sulfide of Li. Examples of the sulfide of Li may include $Li_2S$. Examples of the raw material containing the P element may include a simple substance of P and a sulfide of P. Examples of the sulfide of P may include $P_2S_5$. Examples of the raw material containing the S element may include a simple substance of S, a sulfide of Li, and a sulfide of P. Examples of the raw material containing an O element may include an oxide of Li and an oxide of P. Examples of the oxide of Li may include $Li_2O$. Examples of the oxide of P may include $P_2O_5$.

The raw material composition may be obtained, for example, by mixing each raw material. It is preferable that the proportion of each raw material is appropriately adjusted in consideration of the composition of the target sulfide solid electrolyte. Although there is no particular limitation on the method of mixing the raw materials, for example, a method of mixing the raw materials while pulverizing them is preferred. This is because a more uniform raw material composition may be obtained. Examples of a method of mixing the raw materials while pulverizing may include a vibration mill.

The heating temperature when heating the raw material composition is, for example, 700° C. or more, may be 800° C. or more, and may be 900° C. or more. On the other hand, the heating temperature is, for example, 1200° C. or less, and may be 1100° C. or less. Further, the heating time is, for example, 30 minutes or more, and may be 1 hour or more. On the other hand, the heating time is, for example, 100 hours or less, and may be 50 hours or less. Also, it is preferable that the heating atmosphere is under a vacuum or an inert gas atmosphere from the viewpoint of preventing oxidation. Examples of the heating method may include a method using a firing furnace.

By quenching the melted raw material composition, a sulfide solid electrolyte including a desired crystal portion may be obtained. The cooling rate is, for example, 500° C./minute or more, and may be 700° C./minute or more. Further, it is preferable to cool by quenching to, for example, 100° C. or less, more preferably to 50° C. or less. As the cooling method, a method wherein the melted raw material composition is directly or indirectly contacted with a refrigerant, is usually used. Specific examples thereof may include a method of bringing a container containing a melted raw material composition into contact with a liquid such as water and ice water, and a method of bringing the melted raw material composition into contact with a rotating metal roll.

B. All Solid State Battery

Figure 2:
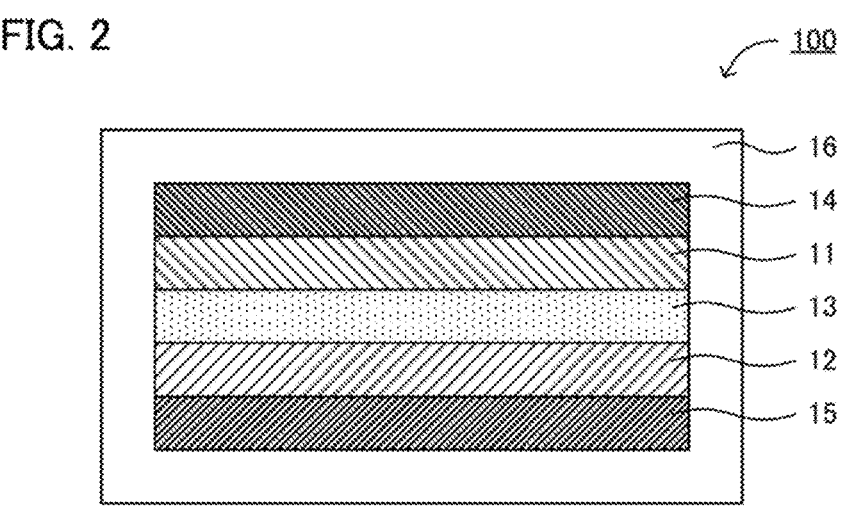
FIG. 2 is a schematic cross-sectional view showing an example of the all solid state battery in the present disclosure.

FIG. 2 is a schematic cross-sectional view showing an example of the all solid state battery in the present disclosure. All solid state battery 100 shown in FIG. 2 comprises cathode active material layer 11 including a cathode active material, anode active material layer 12 including an anode active material, solid electrolyte layer 13 formed between cathode active material layer 11 and anode active material layer 12, cathode current collector 14 for collecting current of cathode active material layer 11, anode current collector 15 for collecting current of anode active material layer 12, and a battery case 16 for storing these members. A characteristic in the present disclosure is that, at least one of cathode active material layer 11, anode active material layer 12, and electrolyte layer 13 includes the above described sulfide solid electrolyte.

According to the present disclosure, by using the above described sulfide solid electrolyte, the output property of an all solid state battery may be maintained even, for example, under a high humidity environment.

1. Cathode Active Material Layer

The cathode active material layer is a layer including at least a cathode active material, and may include at least one of a solid electrolyte, a conductive material, and a binder, if necessary. In particular, in the present disclosure, it is preferable that the cathode active material layer includes the above described sulfide solid electrolyte. The proportion of the sulfide solid electrolyte included in the cathode active material layer is, for example, 0.1 volume % or more, may be 1 volume % or more, and may be 10 volume % or more. On the other hand, the proportion of the sulfide solid electrolyte included in the cathode active material layer is, for example, 80 volume % or less, may be 60 volume % or less, and may be 50 volume % or less. Further, examples of the cathode active material may include oxide active materials such as $LiCoO_2$, $LiMnO_2$, $Li_2NiMn_3O_8$, $LiVO_2$, $LiCrO_2$, $LiFePO_4$, $LiCoPO_4$, $LiNiO_2$, $LiNi_{1/3}Co_{1/3}Mn_{1/3}O_2$.

The cathode active material layer may include a conductive material. By adding the conductive material, the conductivity of the cathode active material layer may be improved. Examples of the conductive material may include carbon materials such as acetylene black, Ketjen black, and carbon fiber. Further, the cathode active material layer may include a binder. Examples of the binder may include a fluorine based binder such as polyvinylidene fluoride (PVDF). Further, the thickness of the cathode active material layer is, for example, 0.1 μm or more and 1000 μm or less.

2. Anode Active Material Layer

The anode active material layer is a layer including at least an anode active material, and may include at least one of a solid electrolyte, a conductive material, and a binder, if necessary. In particular, in the present disclosure, it is preferable that the anode active material layer includes the above described sulfide solid electrolyte. The proportion of the sulfide solid electrolyte included in the anode active material layer is, for example, 0.1 volume % or more, may be 1 volume % or more, and may be 10 volume % or more. On the other hand, the proportion of the sulfide solid electrolyte included in the anode active material layer is, for example, 80 volume % or less, may be 60 volume % or less, and may be 50 volume % or less. Further, examples of the anode active material may include a metal active material and a carbon active material. Examples of the metal active material may include In, Al, Si, and Sn. On the other hand, examples of the carbon active material may include mesocarbon microbeads (MCMB), highly oriented pyrolytic graphite (HOPG), hard carbon, and soft carbon.

Incidentally, the conductive material and the binder used for the anode active material layer are the same as those in the case of the cathode active material layer described above. Further, the thickness of the anode active material layer is, for example, 0.1 μm or more and 1000 μm or less.

3. Solid Electrolyte Layer

The solid electrolyte layer is a layer formed between the cathode active material layer and the anode active material layer. Further, the solid electrolyte layer is a layer including at least a solid electrolyte, and may include a binder if necessary. In particular, in the present disclosure, it is preferable that the solid electrolyte layer includes the sulfide solid electrolyte described above. The proportion of the sulfide solid electrolyte included in the solid electrolyte layer is, for example, 50 volume % or more, may be 70 volume % or more, and may be 90 volume % or more. Incidentally, the binder used for the solid electrolyte layer is the same as in the case of the cathode active material layer described above. Further, the thickness of the solid electrolyte layer is, for example, 0.1 μm or more and 1000 μm or less.

4. Other Configurations

The all solid state battery in the present disclosure comprises at least the cathode active material layer, the solid electrolyte layer, and the anode active material layer described above. Further, a cathode current collector for collecting current of the cathode active material layer and an anode current collector for collecting current of the anode active material layer are usually provided. Examples of the material for the cathode current collector may include SUS, aluminum, nickel, iron, titanium, and carbon. On the other hand, examples of the material for the anode current collector may include SUS, copper, nickel, and carbon.

5. All Solid State Battery

The all solid state battery in the present disclosure is preferably an all solid state lithium ion battery. The all solid state battery may be a primary battery, and may be a secondary battery. Among the above, the latter is preferable, so as to be repeatedly charged and discharged, and is useful as, for example, a car-mounted battery.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

$Li_2S$, $P_2S_5$ and $P_2O_5$ were weighed and mixed with a vibrating mill for 30 minutes to obtain the composition of $Li_3PS_3O$. The resulting mixture was placed in a carbon crucible and vacuum sealed in a quartz tube per carbon crucible. The pressure of the vacuum-sealed quartz tube was approximately 30 Pa. The vacuum-sealed quartz tube was placed in a firing furnace, heated at 950° C. for 2.5 hours, and then, quenched by charging to ice water. Thus, a sulfide solid electrolyte was obtained.

Example 2

A sulfide solid electrolyte was obtained in the same manner as in Example 1 except that $Li_2S$, $P_2S_5$, $P_2O_5$ and P were weighed so as to obtain the composition of $Li_{3.2}PS_{2.8}O_{1.2}$.

Example 3

A sulfide solid electrolyte was obtained in the same manner as in Example 1 except that $Li_2S$, $P_2S_5$ and $P_2O_5$ were weighed so as to obtain the composition of $Li_3PS_{3.2}O_{0.8}$.

Comparative Example 1

$Li_2S$, $P_2S_5$ and $P_2O_5$ were weighed and put into zirconium pots so as to obtain the composition of $Li_3PS_3O$. Further, zirconia balls were also introduced, and mechanical alloying was performed by a planetary ball mill under the conditions of a rotational speed of 380 rpm for 40 hours. Thus, a sulfide glass was obtained. The obtained sulfide glass was press-molded under 20 MPa, and the obtained pellet was placed in a quartz tube, and sealed in a vacuum. The pressure of the vacuum-sealed quartz tube was approximately 30 Pa. The vacuum-sealed quartz tube was placed in a firing furnace, heated at 260° C. for 4 hours, and then, naturally cooled. Thus, a sulfide solid electrolyte was obtained.

Comparative Example 2

A sulfide solid electrolyte was obtained in the same manner as in Comparative Example 1 except that $Li_2S$, $P_2S_5$, $P_2O_5$ and P were weighed so as to obtain the composition of $Li_{3.2}PS_{2.8}O_{1.2}$.

Comparative Example 3

A sulfide solid electrolyte was obtained in the same manner as in Comparative Example 1, except that $Li_2S$, $P_2S_5$ and $P_2O_5$ were weighed so as to obtain the composition of $Li_3PS_{3.2}O_{0.8}$.

Evaluation

<TEM Measurement>

Figure 3:
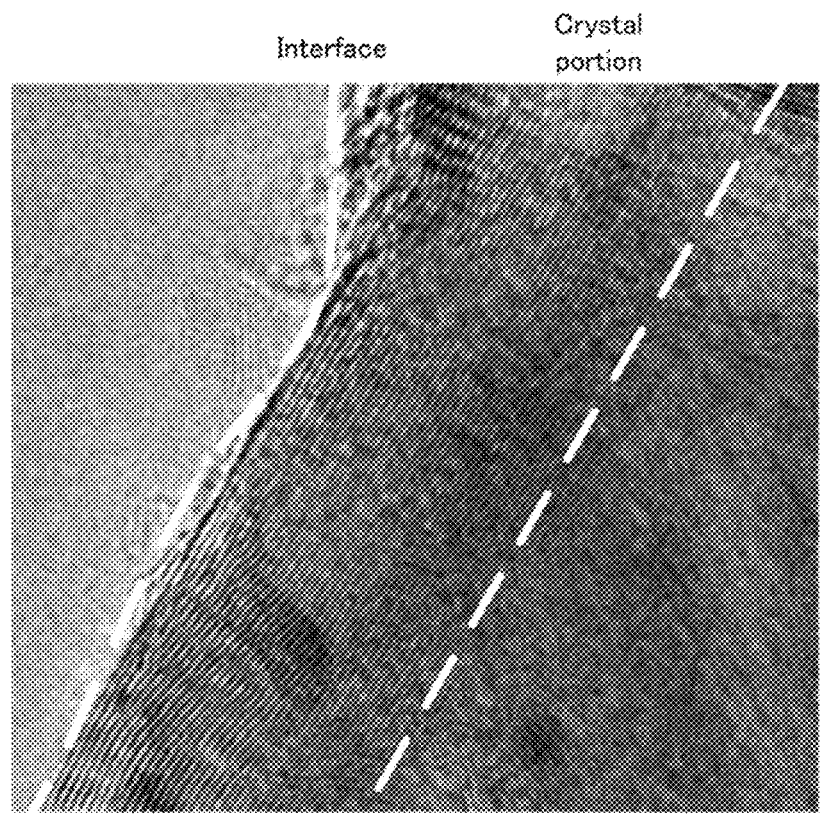
FIG. 3 is a TEM image of the sulfide solid electrolyte obtained in Example 1.
Figure 4:
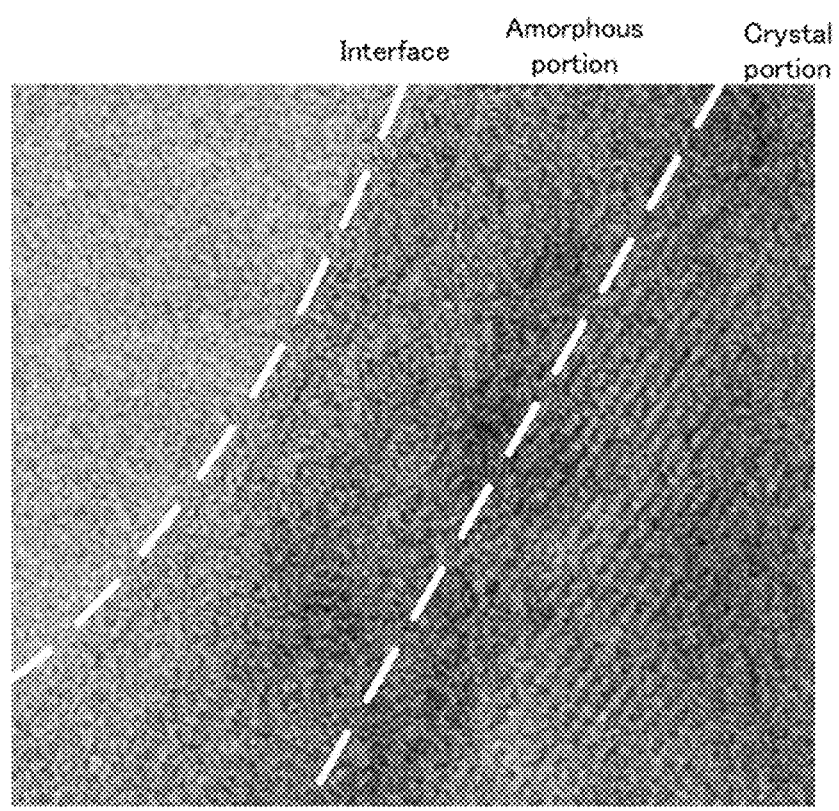
FIG. 4 is a TEM image of the sulfide solid electrolyte obtained in Comparative Example 1.

The sulfide solid electrolytes obtained in Examples 1 to 3 and Comparative Examples 1 to 3 were observed with a transmission electron microscope (TEM). The powder of the obtained sulfide solid electrolyte was supported on a carbon porous mesh in an inert atmosphere, and observation was performed. Typical results are shown in FIGS. 3 and 4. FIG. 3 is a TEM image of the sulfide solid electrolyte obtained in Example 1, and FIG. 4 is a TEM image of the sulfide solid electrolyte obtained in Comparative Example 1.

As shown in FIG. 3, in Example 1, it was confirmed that a crystal portion oriented along the granular shape was formed on the inner surface of the sulfide solid electrolyte. It is presumed that the reason why the crystal portion was formed on the inner surface of the sulfide solid electrolyte is that, by performing melt quenching based on the conditions of Example 1, ideal nucleation and nucleation growth occurred on the particle surface. Incidentally, although not shown in the figure, the crystal portion was formed on the entire surface of the sulfide solid electrolyte. On the other hand, the thickness of the crystal portion was not even, and in the region where the crystal portion was thin, the thickness was approximately 1.8 nm, and in the region where the crystal portion was thick, the thickness was approximately 65 nm. Incidentally, the particle size of this sulfide solid electrolyte was approximately 2 μm, and the proportion of the thickness of the crystal portion to the particle size was 0.001 or more and 0.04 or less. On the other hand, as shown in FIG. 4, in Comparative Example 1, an amorphous portion was formed on the inner surface of the sulfide solid electrolyte, and a crystal portion was formed inside the amorphous portion.

<Water Resistance Evaluation>

The sulfide solid electrolytes obtained in Examples 1 to 3 and Comparative Examples 1 to 3 were used to measure Li ion conductivity. First, in a glove box of dew point −80° C., 200 mg of the sulfide solid electrolyte was weighed, put into a cylinder made of macor, and pressed under pressure of 4 ton/cm². Both ends of the obtained pellet were sandwiched by SUS pins, and a confining pressure was applied to the pellet by bolting so as to obtain an evaluation cell (without exposure).

Next, an evaluation cell (with exposure) was fabricated. First, the sulfide solid electrolyte was allowed to stand for 6 hours in a glove box controlled to a dewpoint of −30° C. An evaluation cell (with exposure) was obtained in the same manner as described above, except that the obtained sulfide solid electrolyte (with exposure) was used.

Next, for the evaluation cell (without exposure) and the evaluation cell (with exposure), the Li ion conductivity at 25° C. was calculated by the AC impedance method. For measurement, a solartron 1260 was used, with an applied voltage of 5 mV and a measurement frequency range of 0.01 MHz to 1 MHz. Also, the Li ion conductivity of the evaluation cell (with exposure) relative to the Li ion conductivity of the evaluation cell (without exposure) was determined as a retention rate (%). The results are shown in Table 1.

TABLE 1

| | Composition | Crystal portion on inner surface | Li ion conductivity (S/cm) Without exposure | Li ion conductivity (S/cm) With exposure | Retention rate (%) |
|---|---|---|---|---|---|
| Example 1 | $Li_3PS_3O$ | Exist | $1.12 \times 10^{-4}$ | $8.92 \times 10^{-5}$ | 79 |
| Comp. Ex. 1 | $Li_3PS_3O$ | Not exist | $1.76 \times 10^{-4}$ | $1.08 \times 10^{-4}$ | 61 |
| Example 2 | $Li_{3.2}PS_{2.8}O_{1.2}$ | Exist | $6.68 \times 10^{-5}$ | $4.82 \times 10^{-5}$ | 72 |
| Comp. Ex. 2 | $Li_{3.2}PS_{2.8}O_{1.2}$ | Not exist | $8.55 \times 10^{-5}$ | $4.76 \times 10^{-5}$ | 56 |
| Example 3 | $Li_3PS_{3.2}O_{0.8}$ | Exist | $1.97 \times 10^{-4}$ | $9.06 \times 10^{-5}$ | 46 |
| Comp. Ex. 3 | $Li_3PS_{3.2}O_{0.8}$ | Not exist | $2.75 \times 10^{-4}$ | $6.69 \times 10^{-5}$ | 24 |

As shown in Table 1, in Examples 1 to 3, the retention rate was higher than Comparative Examples 1 to 3, respectively. Particularly, in Examples 1 and 2, the retention rate exceeded 70%, and exceptional results were obtained. It is presumed that this was because a crystal portion was formed on the inner surface of the sulfide solid electrolyte so that the crystal portion suppressed an interchange reaction between Li ions and protons.

<XRD Measurement and NMR Measurement>

The sulfide solid electrolytes obtained in Example 1 and Comparative Example 1 were subjected to X-ray diffraction (XRD) measurement and NMR measurement. XRD measurement was performed under conditions of using an inert atmosphere, and CuKα radiation. Also, the NMR measurement was carried out by $^{31}$P-NMR using the MAS (Magic Angle Spinning) method. The results are shown in FIGS. 5 and 6.

Figure 5:
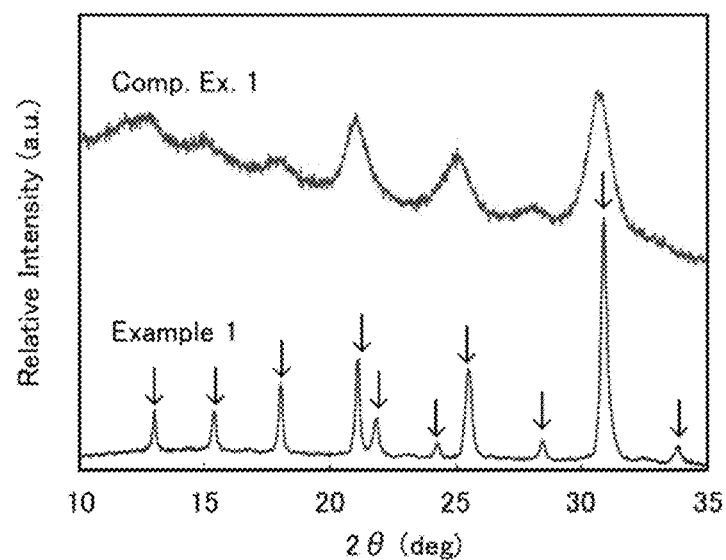
FIG. 5 is the result of the XRD measurement to the sulfide solid electrolyte obtained in Example 1 and Comparative Example 1.
Figure 6:
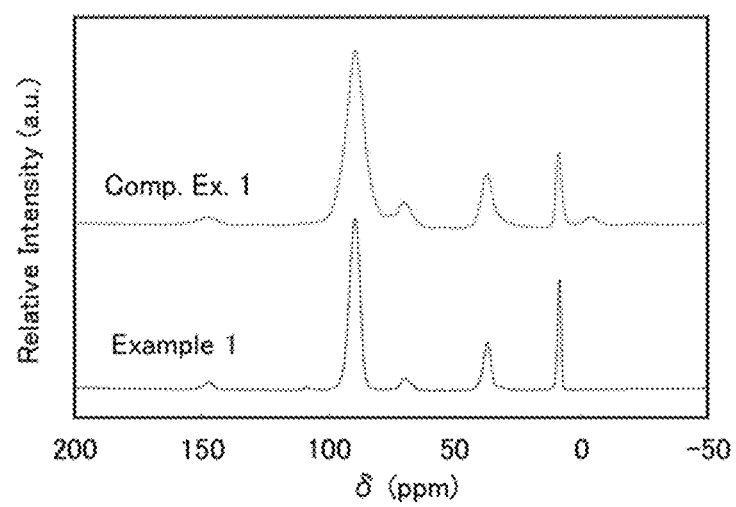
FIG. 6 is the result of the NMR measurement to the sulfide solid electrolyte obtained in Example 1 and Comparative Example 1.

As shown in FIG. 5, distinguishing peaks were observed at positions of 2θ=13.0°, 15.4°, 18.0°, 21.1°, 21.8°, 24.3°, 25.5°, 28.4°, 30.9°, and 33.9°, and it was confirmed that the material was a single phase material of the crystal phase A. Further, as shown in FIGS. 5 and 6, it was confirmed that the sulfide solid electrolyte obtained in Example 1 had higher crystallinity than the sulfide solid electrolyte obtained in Comparative Example 1. Specifically, in FIG. 5, the half band width of the main peak located in the vicinity of 2θ=30.9° was 0.28° in Example 1, and was 0.92° in Comparative Example 1. Further, in FIG. 6, the half band width of the main peak located in the vicinity of δ=89.5 ppm was 4.4 ppm in Example 1, and was 7.6 ppm in Comparative Example 1. Generally, melt quenching is known as a method for synthesizing amorphous, and heat treatment is known as a method for enhancing crystallinity. Surprisingly, the crystallinity of the sulfide solid electrolyte obtained in Example 1 became higher than the crystallinity of the sulfide solid electrolyte obtained in Comparative Example 1. Further, a crystal portion was unexpectedly formed on the inner surface of the sulfide solid electrolyte obtained in Example 1. As described above, this crystal portion was effective in suppressing a decrease in Li ion conductivity due to moisture.

REFERENCE SIGNS LIST

1: crystal portion
2: amorphous portion
10: sulfide solid electrolyte
11: cathode active material layer
12: anode active material layer
13: solid electrolyte layer
14: cathode current collector
15: anode current collector
16: battery case
100: all solid state battery

The invention claimed is:

1. A sulfide solid electrolyte comprising a Li element, a P element, a S element and an O element,
   wherein the sulfide solid electrolyte has a granular shape,
   the sulfide solid electrolyte includes a crystal portion, on an inner surface of the sulfide solid electrolyte,
   the sulfide solid electrolyte has a composition represented by $Li_{3+x}PS_{4-y}O_y$, wherein x satisfies $0 \leq x \leq 1$, and y satisfies $0 \leq y \leq 4$; and
   the crystal portion includes an LGPS type crystal phase.

2. The sulfide solid electrolyte according to claim 1, wherein the crystal portion is oriented along the granular shape.

3. The sulfide solid electrolyte according to claim 1, wherein a thickness of the crystal portion is 1.7 nm or more.

4. The sulfide solid electrolyte according to claim 1, wherein among all surface regions of the sulfide solid electrolyte, the proportion of the region where the crystal portion is formed is 90% or more.

5. The sulfide solid electrolyte according to claim 1, wherein the x satisfies $0 \leq x \leq 0.2$, and the y satisfies $0.8 \leq y \leq 1.2$.

6. An all solid state battery comprising a cathode active material layer including a cathode active material, an anode active material layer including an anode active material, and a solid electrolyte layer formed between the cathode active material layer and the anode active material layer, and
   at least one of the cathode active material layer, the anode active material layer, and the solid electrolyte layer includes the sulfide solid electrolyte according to claim 1.

* * * * *